(12) United States Patent
Wilson et al.

(10) Patent No.: US 10,907,830 B2
(45) Date of Patent: Feb. 2, 2021

(54) COMBUSTOR CHAMBER ARRANGEMENT WITH SEALING RING

(71) Applicant: ROLLS-ROYCE plc, London (GB)

(72) Inventors: David P. Wilson, Derby (GB); John E. Rimmer, Loughborough (GB); Damian Martin, Derby (GB)

(73) Assignee: Rolls-Royce plc

( * ) Notice: Subject to any disclaimer, the term of this patent is extended or adjusted under 35 U.S.C. 154(b) by 131 days.

(21) Appl. No.: 16/187,022

(22) Filed: Nov. 12, 2018

(65) Prior Publication Data

US 2019/0170352 A1 Jun. 6, 2019

(30) Foreign Application Priority Data

Dec. 5, 2017 (GB) .................................. 1720254.0

(51) Int. Cl.
*F23R 3/06* (2006.01)
*F02C 7/18* (2006.01)
(Continued)

(52) U.S. Cl.
CPC .................. *F23R 3/06* (2013.01); *F02C 7/18* (2013.01); *F23R 3/005* (2013.01); *F23R 3/007* (2013.01);
(Continued)

(58) Field of Classification Search
CPC .................. F23R 3/002; F23R 3/06; F23R 2900/003042; F23R 2900/003043; F23R 2900/003044; F02C 7/18; F05D 2240/35
See application file for complete search history.

(56) References Cited

U.S. PATENT DOCUMENTS

| 2,423,129 | A | * | 7/1947 | Tobias | ..................... | E05C 17/60 188/57 |
| 3,899,876 | A | * | 8/1975 | Williamson | ............ | F23R 3/002 60/757 |

(Continued)

FOREIGN PATENT DOCUMENTS

EP    2728115 A1    5/2014

OTHER PUBLICATIONS

Great Britain Search and Examination Report dated Apr. 15, 2019 and issued in connection with GB Patent Application No. 1818136.2.

(Continued)

*Primary Examiner* — Craig Kim
(74) *Attorney, Agent, or Firm* — Barnes & Thornburg LLP

(57) ABSTRACT

A combustion chamber arrangement comprises an annular combustion chamber, a plurality of circumferentially arranged vanes and a radially inner sealing ring. The vanes are arranged at the axially downstream end of the annular combustion chamber. Each of the vanes comprises an aerofoil extending radially between a radially inner platform and a radially outer platform. The radially inner sealing ring forms a seal between a downstream end of a radially inner annular wall structure of the combustion chamber and the radially inner platforms of the vanes. A portion of the axial length of the radially inner sealing ring comprises a radially inner wall and a radially outer wall spaced radially from the radially inner wall to define a chamber. The radially inner wall has apertures to supply coolant into the chamber and the radially outer wall has effusion cooling apertures to supply coolant onto the surface of the radially outer wall.

24 Claims, 5 Drawing Sheets

(51) Int. Cl.
    *F23R 3/00*     (2006.01)
    *F23R 3/48*     (2006.01)

(52) U.S. Cl.
    CPC ............ *F23R 3/48* (2013.01); *F05D 2210/12* (2013.01); *F05D 2210/43* (2013.01); *F05D 2220/32* (2013.01); *F05D 2240/35* (2013.01); *F05D 2300/20* (2013.01); *F23R 2900/03042* (2013.01); *F23R 2900/03043* (2013.01); *F23R 2900/03044* (2013.01)

(56) References Cited

U.S. PATENT DOCUMENTS

| | | | | |
|---|---|---|---|---|
| 4,104,874 | A * | 8/1978 | Caruel | F23R 3/04 60/757 |
| 4,555,901 | A * | 12/1985 | Wakeman | F23R 3/08 60/752 |
| 4,805,397 | A * | 2/1989 | Barbier | F23R 3/06 60/800 |
| 4,901,522 | A | 2/1990 | Commaret et al. | |
| 5,417,545 | A | 5/1995 | Harrogate | |
| 5,470,198 | A | 11/1995 | Harrogate et al. | |
| 5,598,697 | A | 2/1997 | Ambrogi et al. | |
| 6,134,877 | A * | 10/2000 | Alkabie | F23R 3/002 60/748 |
| 9,423,129 | B2 * | 8/2016 | Graves | F23R 3/002 |
| 10,519,794 | B2 * | 12/2019 | Corsmeier | F01D 9/023 |
| 10,527,288 | B2 * | 1/2020 | Stastny | F23R 3/54 |
| 2003/0012643 | A1 * | 1/2003 | Tiemann | F01D 5/225 415/170.1 |
| 2012/0204727 | A1 * | 8/2012 | Nordlund | F23R 3/002 96/221 |
| 2013/0152591 | A1 | 6/2013 | Dery et al. | |
| 2014/0123678 | A1 | 5/2014 | Preston, III | |
| 2015/0300645 | A1 * | 10/2015 | Jopp | F23R 3/005 60/753 |
| 2015/0369487 | A1 * | 12/2015 | Dierberger | F23R 3/06 60/772 |
| 2016/0032764 | A1 | 2/2016 | Tibbott et al. | |
| 2017/0108219 | A1 | 4/2017 | Rimmer et al. | |
| 2017/0292392 | A1 * | 10/2017 | Benz | F01D 5/02 |
| 2018/0112597 | A1 | 4/2018 | Eastwood | F01D 25/12 |

OTHER PUBLICATIONS

Great Britain Search Report dated May 4, 2018, issued in GB Patent Application No. 1720254.0.

* cited by examiner

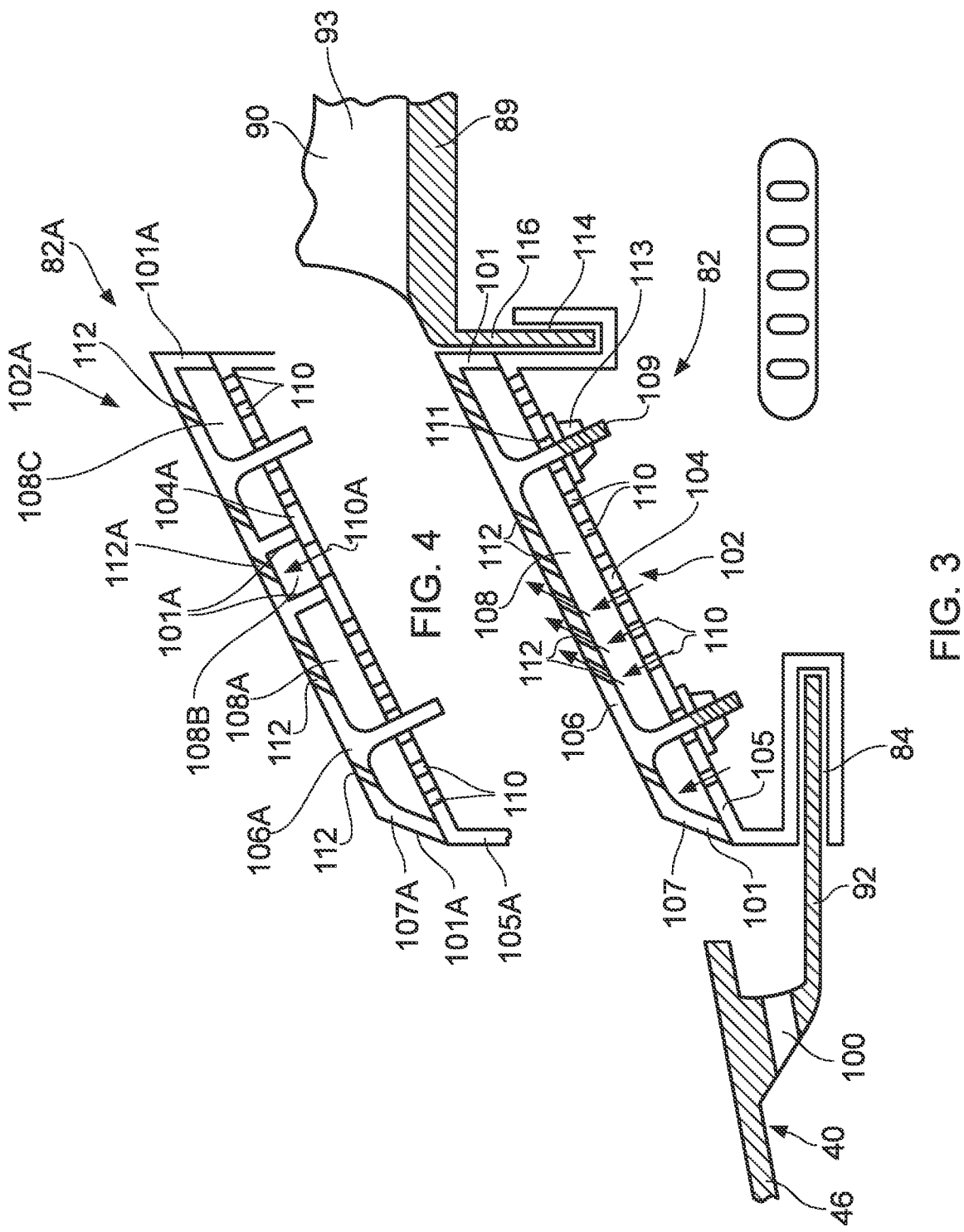

COMBUSTOR CHAMBER ARRANGEMENT WITH SEALING RING

CROSS-REFERENCE TO RELATED APPLICATIONS

This application is based upon and claims the benefit of priority from British Patent Application No. GB 1720254.0, filed on 5 Dec. 2017, the entire contents of which are incorporated by reference.

BACKGROUND

Technical Field

The present disclosure relates to a combustion chamber arrangement and in particular to a gas turbine engine combustion chamber arrangement.

Description of the Related Art

A conventional combustion chamber arrangement comprises an annular combustion chamber, a plurality of circumferentially arranged vanes, a radially inner sealing ring and a radially outer sealing ring. The annular combustion chamber comprises a radially inner annular wall structure, a radially outer annular wall structure spaced radially outwardly from the radially inner annular wall structure and an axially upstream annular wall structure, an upstream end of the radially inner annular wall structure is secured to a radially inner end of the axially upstream annular wall structure and an upstream end of the radially outer annular wall structure is secured to a radially outer end of the axially upstream annular wall structure. The vanes are arranged at the axially downstream end of the annular combustion chamber. The radially inner sealing ring is arranged to form a seal between a downstream end of the radially inner annular wall structure and the radially inner platforms of the vanes and the radially outer sealing ring is arranged to form a seal between a downstream end of the radially outer annular wall structure and the radially outer platforms of the vanes. The radially inner sealing ring is arranged to accommodate relative differential thermal movement, both axial and radial, between the radially inner annular wall structure and the vanes and the radially outer sealing ring is arranged to accommodate relative differential thermal movement, both axial and radial, between the radially outer annular wall structure and the vanes.

Each of the radially inner and outer sealing rings is provided with ballistic cooling apertures which direct dilution cooling air substantially radially into the combustion chamber at one or more planes upstream of the leading edges of the vanes to locally reduce the combustion gas temperature.

However, the current arrangement of the ballistic cooling apertures may not provide sufficient cooling of the radially inner sealing ring. This may result in cracking and thermal distortion of the radially inner sealing ring leading to a reduction in the working life of the radially inner sealing ring. In addition the thermal distortion of the radially inner sealing ring may result in the radially inwardly extending members, or rails, of the vanes being exposed to hot combustion gases and hence thermal oxidation reducing the working life of the vanes.

The present disclosure seeks to reduce or overcome the above mentioned problems.

SUMMARY

According to a first aspect of the present disclosure there is provided a combustion chamber arrangement comprising an annular combustion chamber, a plurality of circumferentially arranged vanes, a radially inner sealing ring and a radially outer sealing ring, the annular combustion chamber comprising a radially inner annular wall structure, a radially outer annular wall structure spaced radially outwardly from the radially inner annular wall structure and an axially upstream annular wall structure, an upstream end of the radially inner annular wall structure being secured to a radially inner end of the axially upstream annular wall structure and an upstream end of the radially outer annular wall structure being secured to a radially outer end of the axially upstream annular wall structure, the vanes being arranged at the axially downstream end of the annular combustion chamber, each of the vanes comprising a radially inner platform, a radially outer platform and an aerofoil extending radially between the radially inner platform and the radially outer platform, the radially inner sealing ring being arranged to form a seal between a downstream end of the radially inner annular wall structure and the radially inner platforms of the vanes and the radially outer sealing ring being arranged to form a seal between a downstream end of the radially outer annular wall structure and the radially outer platforms of the vanes, at least a portion of the axial length of the radially inner sealing ring comprising a dual wall structure, the dual wall structure including a radially inner wall and a radially outer wall spaced radially from the radially inner wall to define at least one chamber, the radially inner wall having a plurality of apertures to supply coolant into the at least one chamber and the radially outer wall having a plurality of effusion cooling apertures to supply coolant from the at least one chamber onto the radially outer surface of the radially outer wall.

The radially inner wall and the radially outer wall may be parallel.

An upstream end of the radially inner sealing ring may have an annular circumferentially and axially extending slot arranged to receive an annular axially extending member at the downstream end of the radially outer annular wall structure. A downstream end of the radially inner sealing ring may have an annular circumferentially and radially extending slot arranged to receive radially extending members at the upstream ends of the radially inner platforms of the vanes. The downstream end of the radially inner sealing ring may be at a greater radius than the upstream end of the radially inner sealing ring.

The dual wall structure may extend the full axial length of the radially inner sealing ring.

The radially inner wall of the dual wall structure may comprise a ring and the radially outer wall may comprise a plurality of circumferentially arranged tiles secured on the ring. The tiles may extend the full length of the radially inner wall of the dual wall structure. An upstream end of the radially inner wall of the dual wall structure may have an annular circumferentially and axially extending slot arranged to receive an annular axially extending member at the downstream end of the radially outer annular wall structure. A downstream end of the radially inner wall of the dual wall structure may have an annular circumferentially and radially extending slot arranged to receive radially extending members at the upstream ends of the radially inner platforms of the vanes. The ring may be a cast and machined ring or a machined ring. Each tile may be secured to the ring by at least one fastener arrangement. The fastener arrangement may comprise an integral threaded stud on the tile arranged to extend through a mounting aperture in the ring and into a cooperating nut. The fastener arrangement may comprise an integral threaded boss on the tile and a corresponding bolt, or screw, arranged to extend through a mounting aperture in the ring and into the threaded boss.

The radially outer wall of the dual wall structure may comprise a ring and the radially inner wall may comprise at least one member secured on the ring. An upstream end of the radially outer wall of the dual wall structure may have an annular circumferentially and axially extending slot arranged to receive an annular axially extending member at the downstream end of the radially outer annular wall structure. A downstream end of the radially outer wall of the dual wall structure may have an annular circumferentially and radially extending slot arranged to receive radially extending members at the upstream ends of the radially inner platforms of the vanes. The ring may be a cast and machined ring or a machined ring. The at least one member may comprise a sheet metal member. The at least one member may be secured to the ring by a welded joint, a brazed joint or a bonded joint. An upstream end of the at least one member may be secured to a structure defining the annular circumferentially and axially extending slot and a downstream end of the at least one member may be secured to a structure defining the annular circumferentially and radially extending slot to define a single chamber. A plurality of members may be secured to the ring to define a plurality of chambers and at least one of the members has apertures to supply coolant into one of the chambers. A plurality of the members may have apertures to supply coolant into a plurality of the chambers.

The radially outer wall and the radially inner wall of the dual wall structure may be an integral structure, e.g. a single piece, a unitary piece or a monolithic piece.

The radially inner sealing ring may comprise a plurality of circumferentially arranged segments, at least a portion of the axial length of each of the segments comprising a dual wall structure, the radially outer wall and the radially inner wall of the dual wall structure of each segment may be an integral structure, e.g. a single piece, a unitary piece or a monolithic piece. Each segment may have at least one chamber. Each segment may have circumferential ends and the circumferential end of each segment has interlocking features to enable adjacent segments to be secured together. Each segment may have an end wall at each of the circumferential ends to define the at least one chamber.

An upstream end of each segment may have a part annular circumferentially and axially extending slot arranged to receive an annular axially extending member at the downstream end of the radially outer annular wall structure. A downstream end of the each segment may have a part annular circumferentially and radially extending slot arranged to receive radially extending members at the upstream ends of the radially inner platforms of the vanes.

The radially outer wall may have a frustoconical radially outer surface. Each segment may have a single chamber arranged at the upstream end of the segment. Each segment may have a single wall structure downstream of the upstream end of the segment. Each segment may have a radial wall to define the single chamber. The radial wall of each segment may be secured to structure defining the part annular circumferentially and axially extending slot. Each segment may have two axially spaced chambers. There may be a single wall structure between the two axially spaced chambers. There may be ballistic cooling apertures in the single wall structure. The single wall structure may be set back from the frustoconical radially outer surface to form an annular recess. Each segment may have a radial wall to define an upstream chamber upstream of the single wall structure and a radially inner wall parallel to the radially outer wall to define a downstream chamber. Each segment may have at least one aperture, preferably a plurality of apertures, to supply coolant into the annular recess and over the frustoconical radially outer surface. Each segment may have an inlet to the downstream chamber which is defined radially between the radially outer wall and the radially inner wall at the upstream end of the downstream chamber. Each segment may have an outlet from the downstream chamber which is defined radially between the radially outer wall and the radially inner wall at the downstream end of the downstream chamber. The radially inner wall may be imperforate and the radially outer wall may be imperforate. The downstream chamber of each segment may have a plurality of pedestals. The pedestals may interconnect the radially inner wall and the radially outer wall, the pedestals may extend radially inwardly from the radially outer wall towards the radially inner wall or the pedestals may extend radially outwardly from the radially inner wall towards the radially outer wall.

The radially outer wall may have a first frustoconical radially outer surface, a second frustoconical radially outer surface parallel to and downstream of the first frustoconical radially outer surface, a radial surface from the upstream end of the second frustoconical radially outer surface to the downstream end of the first frustoconical radially outer surface and the downstream end of the first frustoconical radially outer surface is spaced radially inwardly of the upstream end of the second frustoconical radially outer surface. At least one aperture, preferably a plurality of apertures, may be arranged in the radial surface to direct coolant over the second frustoconical radially outer surface. Each segment may have a single chamber arranged at the upstream end of the segment. Each segment may have a single wall structure downstream of the upstream end of the segment. The chamber may be arranged to supply coolant through the at least one aperture in the radial surface over the second frustoconical radially outer surface. Each segment may have three axially spaced chambers. There may be a single wall structure between a middle chamber and a downstream chamber of the three axially spaced chambers. There may be ballistic cooling apertures in the single wall structure. The at least one aperture in the radial surface may be arranged to direct coolant over a portion of the radially outer wall defining the middle chamber and downstream chamber.

The skilled person will appreciate that except where mutually exclusive, a feature described in relation to any one of the above aspects of the invention may be applied mutatis mutandis to any other aspect of the invention.

DESCRIPTION OF THE DRAWINGS

Embodiments of the invention will now be described by way of example only, with reference to the Figures, in which:

FIG. 3 is a further enlarged cross-sectional view of part of a downstream end of a radially inner annular wall structure, a radially inner sealing ring and a stage of nozzle guide vanes of the combustion chamber arrangement shown in FIG. 2.

FIG. 4 is further enlarged cross-sectional view of an alternative radially inner sealing ring of the combustion chamber arrangement shown in FIG. 2.

DETAILED DESCRIPTION

Figure 1:
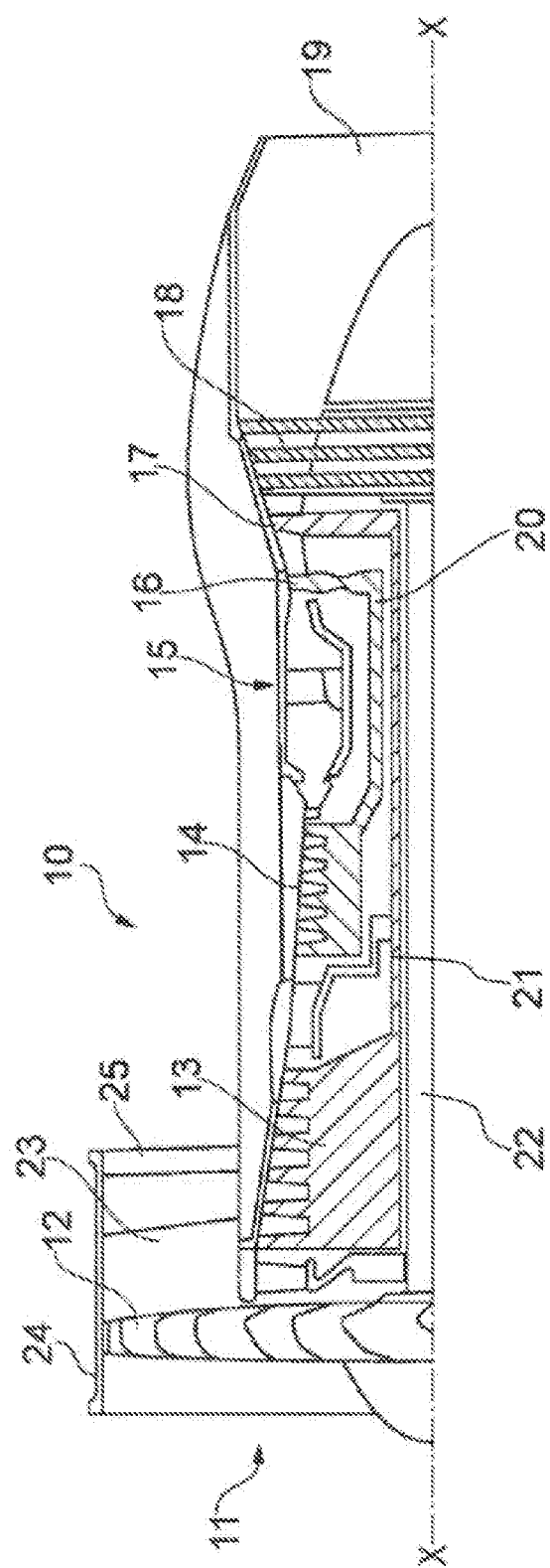
FIG. 1 is a sectional side view of a gas turbine engine having a combustion chamber arrangement according to the present disclosure.

With reference to FIG. 1, a gas turbine engine is generally indicated at 10, having a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and an exhaust nozzle 19. A fan nacelle 24 generally surrounds the fan 12 and defines the intake 11 and a fan duct 23. The fan nacelle 24 is secured to the core engine by fan outlet guide vanes 25.

The gas turbine engine 10 works in the conventional manner so that air entering the intake 11 is compressed by the fan 12 to produce two air flows: a first air flow into the intermediate pressure compressor 13 and a second air flow which passes through the bypass duct 23 to provide propulsive thrust. The intermediate pressure compressor 13 compresses the air flow directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high 16, intermediate 17 and low 18 pressure turbines drive respectively the high pressure compressor 14, the intermediate pressure compressor 13 and the fan 12, each by suitable interconnecting shaft 20, 21 and 22 respectively.

Figure 2:
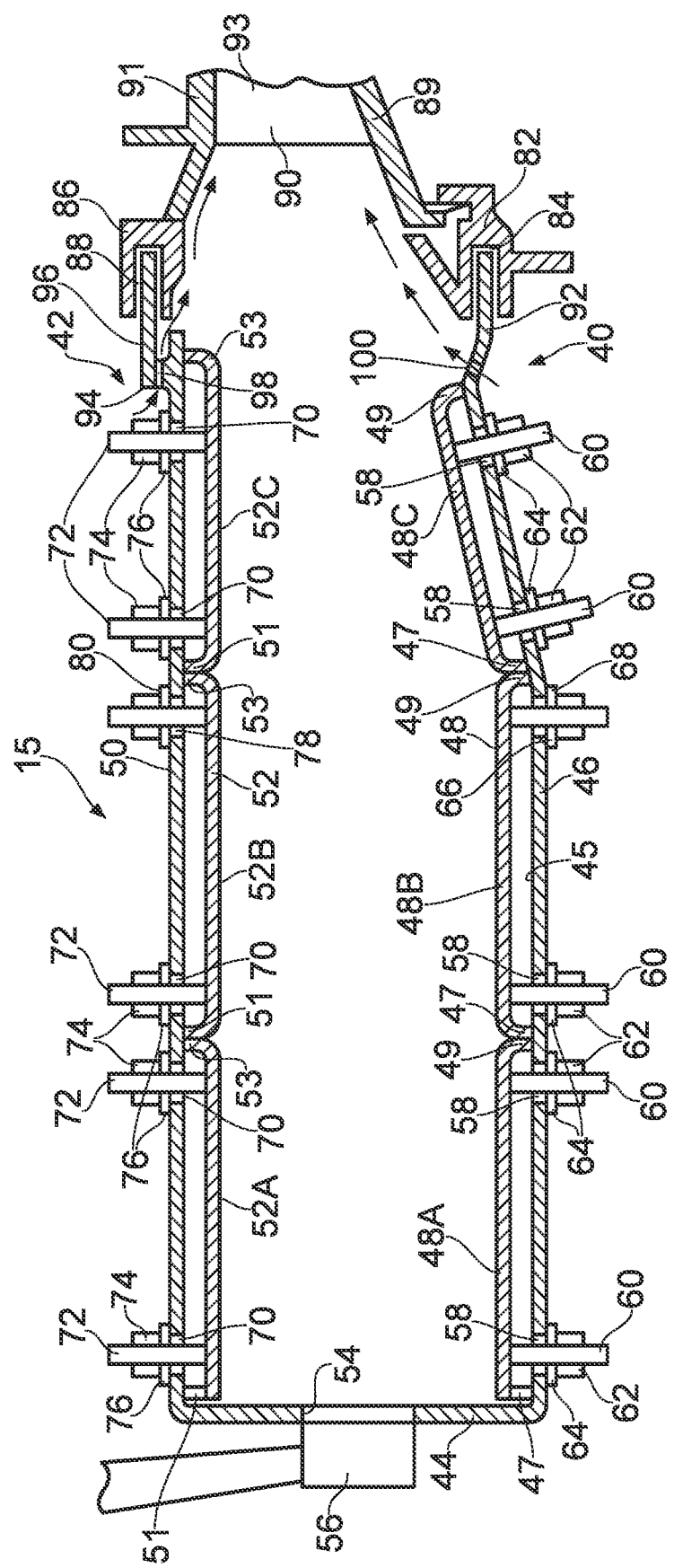
FIG. 2 is an enlarged cross-sectional view through a combustion chamber arrangement according to the present disclosure.

The combustion chamber 15, as shown more clearly in FIG. 2, is an annular combustion chamber and comprises a radially inner annular wall structure 40, a radially outer annular wall structure 42 and an upstream end wall structure 44. The radially outer annular wall structure 42 is spaced radially outwardly from the radially inner annular wall structure 40. The radially inner annular wall structure 40 comprises a first annular wall 46 and a second annular wall 48. The radially outer annular wall structure 42 comprises a third annular wall 50 and a fourth annular wall 52. The second annular wall 48 is spaced radially from and is arranged radially around the first annular wall 46 and the first annular wall 46 supports the second annular wall 48. The fourth annular wall 52 is spaced radially from and is arranged radially within the third annular wall 50 and the third annular wall 50 supports the fourth annular wall 52. An upstream end of the radially inner annular wall structure 40 is secured to a radially inner end of the axially upstream annular wall structure 44 and an upstream end of the radially outer annular wall structure 42 is secured to a radially outer end of the axially upstream annular wall structure 44. In particular, the upstream end of the first annular wall 46 is secured to the upstream end wall structure 44 and the upstream end of the third annular wall 50 is secured to the upstream end wall structure 44. The upstream end wall structure 44 has a plurality of circumferentially spaced apertures 54 and each aperture 54 has a respective one of a plurality of fuel injectors 56 located therein. The fuel injectors 56 are arranged to supply fuel into the annular combustion chamber 15 during operation of the gas turbine engine 10.

The first annular wall 46 has a plurality of mounting apertures 58 extending there-though and the second annular wall 48 has a plurality of fasteners 60 extending radially there-from. Each fastener 60 on the second annular wall 48 extends radially through a corresponding mounting aperture 58 in the first annular wall 46. A cooperating fastener 62 locates on each of the fasteners 60 extending through the mounting apertures 58 in the first annular wall 46. A washer 64 is positioned between each fastener 60 on the second annular wall 48 and the cooperating fastener 62. Each washer 64 has a first surface 66 abutting an outer surface of the first annular wall 46 and a second surface 68 abutting a surface of the cooperating fastener 62. The second annular wall 48 comprises a plurality of segments, or tiles, 48A, 48B and 48C and the segments, or tiles, 48A, 48B and 48C are arranged circumferentially and axially around the first annular wall 46. The axially extending edges of adjacent segments, or tiles, 48A, 48B and/or 48B may abut each other or may overlap each other and the circumferentially extending ends of adjacent segments, or tiles, 48A, 48B and 48C may abut each other or may overlap each other.

Similarly, the third annular wall 50 has a plurality of mounting apertures 70 extending there-though and the fourth annular wall 52 has a plurality of fasteners 72 extending radially there-from. Each fastener 72 on the fourth annular wall 52 extends radially through a corresponding mounting aperture 70 in the third annular wall 50. A cooperating fastener 74 locates on each of the fasteners 72 extending through the mounting apertures 70 in the third annular wall 50. A washer 76 is positioned between each fastener 72 on the fourth annular wall 52 and the cooperating fastener 74. Each washer 76 has a first surface 78 abutting an outer surface of the third annular wall 50 and a second surface 80 abutting a surface of the cooperating fastener 74. The fourth annular wall 52 comprises a plurality of segments, or tiles, 52A, 52B and 52C and the segments, or tiles, 52A, 52B and 52C are arranged circumferentially and axially adjacent to each other to define the fourth annular wall 52. The axially extending edges of adjacent segments, or tiles, 52A, 52B and/or 52C may abut each other or may overlap each other and the circumferentially extending ends of adjacent segments, or tiles, 52A, 52B and 52C may abut each other or may overlap each other.

The fasteners 60 and 72 on the second and fourth annular walls 48 and 52 are threaded studs which are cast integrally with the segments, or tiles, 48A, 48B, 48C, 52A 52B and 52C or may be secured to the segments, or tiles, 48A, 48B, 48C, 52A, 52B and 52C by welding, brazing etc. The cooperating fasteners 62 and 74 are nuts.

A plurality of nozzle guide vanes 90 are arranged at the axially downstream end of the annular combustion chamber 15. The downstream end of the first annular wall 46 locates in a slot 84 in a radially inner discharge nozzle 82 and the downstream end of the third annular wall 50 locates in a slot 88 in a radially outer discharge nozzle 86. The radially inner discharge nozzle 82 is a radially inner sealing ring and the radially outer discharge nozzle 86 is a radially outer sealing ring. The plurality of nozzle guide vanes 90 are mounted on the radially inner discharge nozzle 82 and the radially outer discharge nozzle 86. Each of the nozzle guide vanes 90 comprises a radially inner platform 89, a radially outer platform 91 and an aerofoil 93 extending radially between the radially inner platform 89 and the radially outer platform 91. The radially inner sealing ring 82 is arranged to form a seal between a downstream end of the radially inner annular wall structure 40 and the radially inner platforms 89 of the vanes 90 and the radially outer sealing ring 86 is arranged to form a seal between a downstream end of the radially outer annular wall structure 42 and the radially outer platforms 91 of the vanes 90. The downstream end of the first annular wall 46 has a projection 92 which locates in the slot 84 in the radially inner discharge nozzle 82. The downstream end of the third annular wall 50 has a cooling ring 94 and the cooling ring 94 comprises an axially extending flange 96 which locates in the slot 88 in the radially outer discharge nozzle 86. The cooling ring 94 also has a plurality of apertures 98 to supply coolant in an axially downstream direction over the radially inner surface of the flange 96, over the radially inner surface of the radially outer discharge nozzle 86 and over the radially inner surface of the radially outer platforms 91 of the nozzle guide vanes 90. The projection 92 has a plurality of apertures 100 to supply coolant in an axially downstream direction over the radially outer surface of the radially inner discharge nozzle 82 and over the radially outer surface of the radially inner platforms 89 of the nozzle guide vanes 90. The radially inner sealing ring 82 is arranged upstream of the radially inner platforms 89 of the vanes 90.

The radially inner sealing ring, the radially inner discharge nozzle, 82 is arranged to accommodate relative differential thermal movement, both axial and radial, between the radially inner annular wall structure 40 and the vanes 90. The radially outer sealing ring, the radially outer discharge nozzle, 86 is arranged to accommodate relative differential thermal movement, both axial and radial, between the radially outer annular wall structure 42 and the vanes 90.

The first and third annular walls 46 and 50 form outer walls of the annular combustion chamber 15 and the second and fourth annular walls 48 and 52 form inner walls of the annular combustion chamber 15. The second annular wall 48 comprises at least one row of circumferentially arranged tiles and in this example there are three rows 48A, 48B and 48C of circumferentially arranged tiles and the tiles 48A form an axially upstream row of circumferentially arranged tiles and the tiles 48C form an axially downstream row of circumferentially arranged tiles. Similarly, the fourth annular wall 52 comprises at least one row of circumferentially arranged tiles and in this example there are three rows 52A, 52B and 52C of circumferentially arranged tiles and the tiles 52A form an axially upstream row of circumferentially arranged tiles and the tiles 52C form an axially downstream row of circumferentially arranged tiles.

The upstream end of each tile 48A, 48B, 48C has a flange 47 extending from the upstream end of the tile towards and sealing with the radially outer surface 45 of the first annular wall 46 and the circumferentially spaced edges of the each tile 48A, 48B and 48C has flanges extending from the circumferentially spaced edges of the tile towards and sealing with the radially outer surface 45 of the first annular wall 46. The downstream end of each tile 48A, 48B has a flange 49 extending from the downstream end of the tile towards and sealing with the radially outer surface 45 of the first annular wall 46. The upstream end of each tile 52A, 52B, 52C has a flange 51 extending from the upstream end of the tile towards and sealing with the radially inner surface of the third annular wall 50 and the circumferentially spaced edges of the each tile 52A, 52B and 52 has flanges extending from the circumferentially spaced edges of the tile towards and sealing with the radially outer surface of the third annular wall 50. The downstream end of each tile 52A, 52B and 52C has a flange 53 extending from the downstream end of the tile towards and sealing with the radially inner surface of the third annular wall 50.

The first annular wall 46 is provided with a plurality of impingement cooling apertures extending perpendicularly there-through to direct coolant, air, onto the surfaces of the tiles 48A, 48B and 48C facing the first annular wall 46 and the tiles 48A, 48B and 48C are provided with angled effusion cooling apertures to provide a film of coolant on the surfaces of the tiles facing away from the first annular wall 46. Similarly, the third annular wall 50 is provided with a plurality of impingement cooling apertures extending perpendicularly there-through to direct coolant, air, onto the surfaces of the tiles 52A, 52B and 52C facing the third annular wall 50 and the tiles 52A, 52B and 52C are provided with angled effusion cooling apertures to provide a film of coolant on the surfaces of the tiles facing away from the third annular wall 50.

As shown more clearly in FIG. 3 at least a portion of the axial length of the radially inner sealing ring, e.g. the radially inner discharge nozzle, 82 comprises a dual wall structure 102. The dual wall 102 structure includes a radially inner wall 104 and a radially outer wall 106 spaced radially from the radially inner wall 104 to define at least one chamber 108. The radially inner wall 104 has a plurality of apertures 110 to supply coolant into the at least one chamber 108 and the radially outer wall 106 has a plurality of effusion cooling apertures 112 to supply coolant onto the radially outer surface of the radially outer wall 106 to form a film of coolant on the radially outer surface of the radially outer wall 106. The effusion cooling apertures 110 also supply coolant into the combustion chamber to control the combustion chamber exit temperature traverse profile. The radially inner wall 104 and the radially outer wall 106 are parallel. The upstream end of the radially inner sealing ring, the radially inner discharge nozzle, 82 has an annular circumferentially and axially extending slot 84 arranged to receive the annular axially extending member 92 at the downstream end of the radially outer annular wall structure 40 to accommodate relative differential thermal movement, axial movement, between the radially inner annular wall structure 40 and the vanes 90. The downstream end of the radially inner sealing ring, radially inner discharge nozzle, 82 has an annular circumferentially and radially extending slot 114 arranged to receive radially inwardly extending members 116 at the upstream ends of the radially inner platforms 89 of the vanes 90 to accommodate relative differential thermal movement, radial movement, between the radially inner annular wall structure 40 and the vanes 90. The downstream end of the radially inner sealing ring, radially inner discharge nozzle, 82 is at a greater radius than the upstream end of the radially inner sealing ring, radially inner discharge nozzle 82. As mentioned previously, the radially inner sealing ring 82 is arranged upstream of the radially inner platforms 89 of the vanes 90 and in particular the whole of the radially inner sealing ring 82 upstream of the annular circumferentially and radially extending slot 114 is arranged upstream of the radially inner platforms 89 of the vanes 90. The radially inner sealing ring 82 is thus exposed to hot combustion gases.

As shown in FIG. 3 the dual wall structure 102 extends the full axial length of the radially inner sealing ring, radially inner discharge nozzle 82. The radially inner wall 104 of the dual wall structure 102 comprises a ring 105 and the radially outer wall 106 comprises a plurality of circumferentially arranged tiles 107 secured on the ring 105. The tiles 107 extend the full length of the radially inner wall 104 of the dual wall structure 102. An upstream end of the radially inner wall 104, the ring 105, of the dual wall structure 102 has a portion, a U-shape portion, defining the annular circumferentially and axially extending slot 84 arranged to receive the annular axially extending member 92 at the downstream end of the radially outer annular wall structure 40. The downstream end of the radially inner wall 104, the ring 105, of the dual wall structure 102 has a portion, a U-shape portion, defining the annular circumferentially and radially extending slot 114 arranged to receive the radially inwardly extending members 116 at the upstream ends of the radially inner platforms 89 of the vanes 90. The ring 105 may be a cast and machined ring or a machined ring. Each tile 107 may be secured to the ring 105 by at least one fastener arrangement. The fastener arrangement may comprise at least one integral threaded stud 109 on the tile 107 arranged to extend through a corresponding mounting aperture 111 in the ring 105 and into a cooperating nut 113. Alternatively, the fastener arrangement may comprise an integral threaded boss on the tile and a corresponding bolt, or screw, arranged to extend through a mounting aperture in the ring and into the threaded boss. Each tile 107 has a peripheral wall 101 extending radially inwardly to abut the ring 105 to define a respective chamber 108 with the ring 105. The peripheral wall 101 extends continuously along an axially upstream edge, an axially downstream edge and two circumferentially spaced edges.

In an alternative arrangement, as shown in FIG. 4, the dual wall structure 102A of the radially inner sealing ring, e.g. the radially inner discharge nozzle, 82A extends the full axial length of the radially inner sealing ring, the radially inner discharge nozzle, 82A. The radially inner wall 104A of the dual wall structure 102A comprises a ring 105A and the radially outer wall 106 of the dual wall structure 102A comprises a plurality of circumferentially arranged tiles 107A secured on the ring 105A. The tiles 107A extend the full length of the radially inner wall 104A of the dual wall structure 102A. The radially inner wall 104A of the dual wall structure 102A is substantially the same as the radially inner wall 104 of the dual wall structure 102 shown in FIG. 3. The radially inner wall 104A and the radially outer wall 106A are parallel. The ring 105A may be a cast and machined ring or a machined ring. Each tile 107A may be secured to the ring 105A by at least one fastener arrangement in substantially the same manner as described with reference to FIG. 3. Again, it is to be noted that each tile 107A has a peripheral wall 101A extending radially inwardly to abut the ring 105A. The arrangement in FIG. 4 differs in that each tile 107A has a pair of axially spaced walls 103A extending radially inwardly to abut the ring 105A. The walls 103A extend circumferentially across each tile 107A to the peripheral wall 101A at the circumferentially spaced edges of the tile 107A so that the walls 103A define three axially spaced chambers 108A, 108B and 108C. The radially inner wall 104A has a plurality of apertures 110 to supply coolant into the chamber 108A and 108C. The radially outer wall 106A has a plurality of effusion cooling apertures 112 to supply coolant onto the radially outer surface of the radially outer wall 106A from the chambers 108A and 108C to form a film of coolant on the radially outer surface of the radially outer wall 106. In addition the radially inner wall 104A has a plurality of apertures 110A to supply coolant into the chamber 108B and the radially outer wall 106A has a plurality of ballistic cooling apertures 112A to supply coolant into the combustion chamber to control the combustion chamber exit temperature traverse profile. The ballistic cooling apertures 112A have a greater cross-sectional area, e.g. diameter, than the effusion cooling apertures 112 and the apertures 110A have a greater cross-sectional area, e.g. diameter, than the apertures 110. The radially inner sealing ring 82A is arranged upstream of the radially inner platforms 89 of the vanes 90 and in particular the whole of the radially inner sealing ring 82A upstream of the annular circumferentially and radially extending slot 114 is arranged upstream of the radially inner platforms 89 of the vanes 90. The radially inner sealing ring 82A is also exposed to hot combustion gases.

In the arrangements of FIGS. 3 and 4 the tiles 107 and 107A are made from a material more heat resistant than the ring 105, for example the tiles 107 and 107A may be made from a more heat resistant nickel, cobalt or iron alloy than the ring 105 or the tiles 107 and 107A may be made from a ceramic and the ring 105 from a nickel, cobalt or iron alloy.

Figure 5:
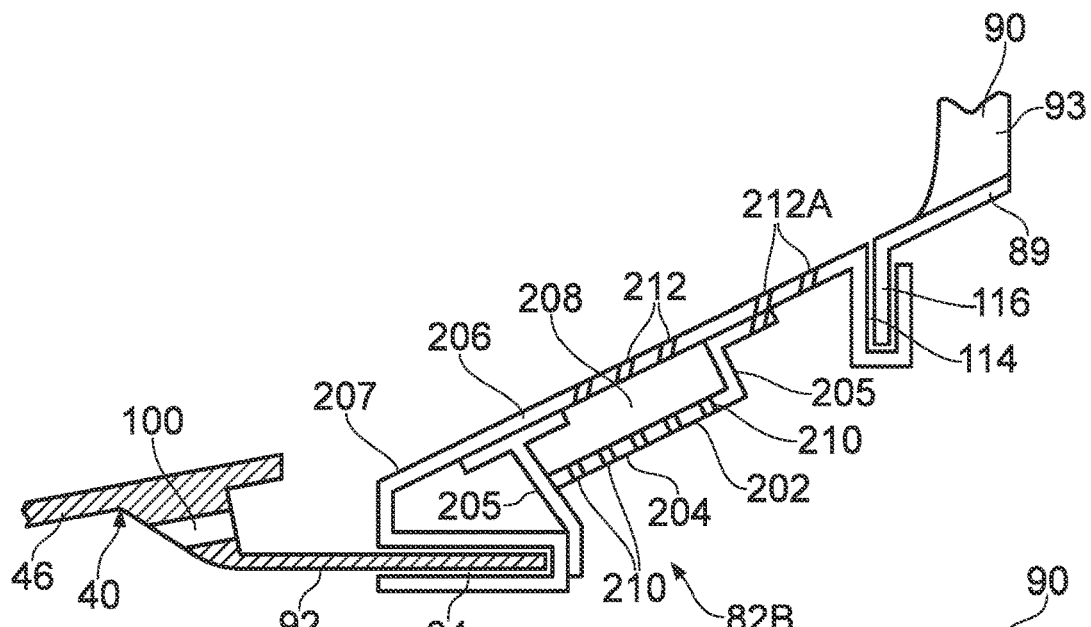
FIG. 5 is further enlarged cross-sectional view of part of a downstream end of a radially inner annular wall structure, a radially inner sealing ring and a stage of nozzle guide vanes of an alternative combustion chamber arrangement shown in FIG. 2.

In a further arrangement as shown in FIG. 5 the dual wall structure 202 of the radially inner sealing ring, e.g. the radially inner discharge nozzle, 82B extends only a portion of the full axial length of the radially inner sealing ring, the radially inner discharge nozzle 82B. In this particular example the dual wall structure 202 extends between and including a third and a half of the full axial length of the radially inner sealing ring, radially inner discharge nozzle 82B. The dual wall 202 structure includes a radially inner wall 204 and a radially outer wall 206 spaced radially from the radially inner wall 204 to define at least one chamber 208. The radially inner wall 204 and the radially outer wall 206 are parallel. The radially inner wall 204 has a plurality of apertures 210 to supply coolant into the at least one chamber 208 and the radially outer wall 206 has a plurality of effusion cooling apertures 212 to supply coolant onto the radially outer surface of the radially outer wall 206 to form a film of coolant on the radially outer surface of the radially outer wall 206. The radially outer wall 206 of the dual wall structure 202 comprises a ring 207 and the radially inner wall 204 comprises at least one member 205 secured on the ring 207. An upstream end of the radially outer wall 206, the ring 207, of the dual wall structure 202 has a portion, a U-shape portion, defining the annular circumferentially and axially extending slot 84 arranged to receive the annular axially extending member 92 at the downstream end of the radially inner annular wall structure 40. A downstream end of the radially outer wall 206, the ring 207, of the dual wall structure 202 has a portion, a U-shape portion, defining an annular circumferentially and radially extending slot 114 arranged to receive the radially inwardly extending members 116 at the upstream ends of the radially inner platforms 89 of the vanes 90. The ring 207 may be a cast and machined ring or a machined ring. The at least one member 205 comprises a sheet metal member. The at least one member 205 is secured to the ring 207 by a welded joint, a brazed joint or a bonded joint. In this example the dual wall structure 202 comprises a single chamber 208. The ring 207, downstream of and a continuation of the radially outer wall 106A of the dual wall structure 202, has a plurality of ballistic cooling apertures 212A to supply coolant into the combustion chamber to control the combustion chamber exit temperature traverse profile. The ballistic cooling apertures 212A have a greater cross-sectional area, e.g. diameter, greater than the effusion cooling apertures 212. The radially inner sealing ring 82B is arranged upstream of the radially inner platforms 89 of the vanes 90 and in particular the whole of the radially inner sealing ring 82B upstream of the annular circumferentially and radially extending slot 114 is arranged upstream of the radially inner platforms 89 of the vanes 90. The radially inner sealing ring 82B is thus exposed to hot combustion gases.

In this example a first member, a substantially T-shape member, is secured at its radially inner end to the portion, the U-shape portion, of the ring 207 defining the annular circumferentially and axially extending slot 84 and is secured at its radially outer end to the ring 207 and a second member, a substantially Z-shape member, is secured at its upstream end to the first member and is secured at its downstream end to the ring 207. The first and second members and the ring 207 define a single chamber 208 and the second member has apertures 210 to supply coolant into the chamber 208 and the ring 207 has effusion cooling apertures 212 to supply coolant out of the chamber 208. It is to be noted that the first member also defines a chamber with the ring 207 but coolant is not supplied into this chamber or supplied out of this chamber. However, it is equally possible to provide apertures in the first member to supply coolant into this chamber and to provide effusion cooling apertures through the ring 207 to form a film of coolant over a greater axial length, up to two thirds of the axial length, of the surface of the ring 207, e.g. of the radially inner sealing ring 82B.

Figure 6:
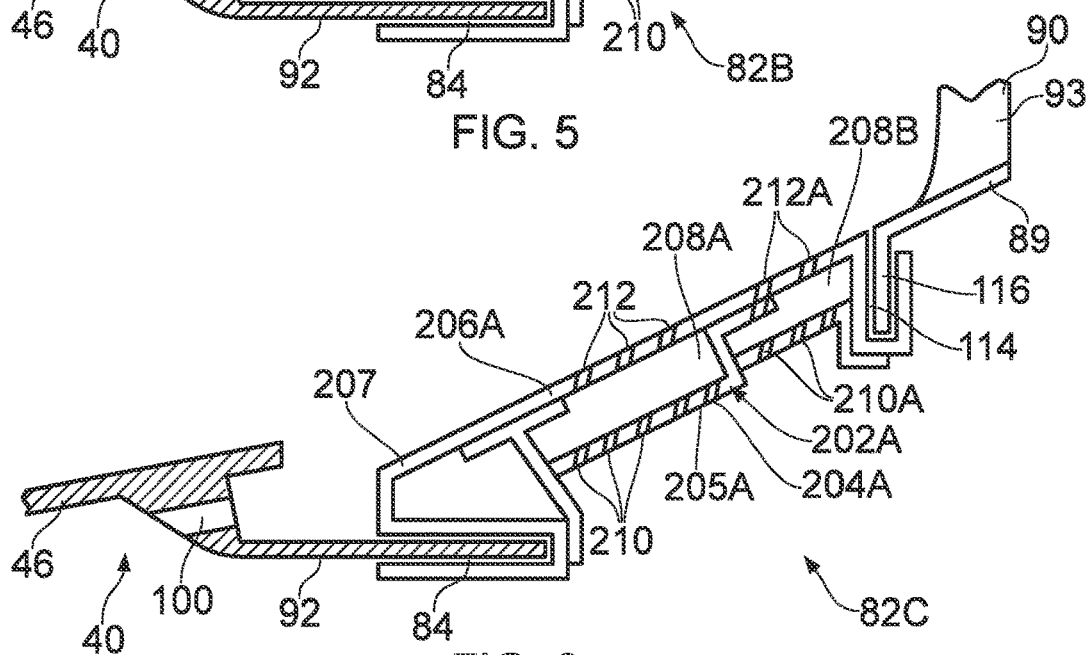
FIG. 6 is further enlarged cross-sectional view of part of a downstream end of a radially inner annular wall structure, a radially inner sealing ring and a stage of nozzle guide vanes of an additional combustion chamber arrangement shown in FIG. 2.

In another arrangement as shown in FIG. 6 the dual wall structure 202A of the radially inner sealing ring, e.g. the radially inner discharge nozzle, 82C extends only a portion of the full axial length of the radially inner sealing ring, radially inner discharge nozzle 82C. The radially inner wall 204A and the radially outer wall 206A are parallel. In this particular example the dual wall structure 202A extends between and including a half and three quarters of the full axial length of the radially inner sealing ring, radially inner discharge nozzle 82B. The radially outer wall 206A of the dual wall structure 202A comprises a ring 207A and the radially inner wall 204A of the dual wall structure 202A comprises a plurality of members 205A secured to the ring 207A. In this example the dual wall structure 202A comprises two chambers 208A and 208B. The radially inner sealing ring 82C is arranged upstream of the radially inner platforms 89 of the vanes 90 and in particular the whole of the radially inner sealing ring 82C upstream of the annular circumferentially and radially extending slot 114 is arranged upstream of the radially inner platforms 89 of the vanes 90. The radially inner sealing ring 82C is thus exposed to hot combustion gases.

In this example a first member, a substantially T-shape member, is secured at its radially inner end to the portion, the U-shape portion, of the ring 207A defining the annular circumferentially and axially extending slot 84 and is secured at its radially outer end to the ring 207. A second member, a substantially Z-shape member, is secured at its upstream end to the first member and is secured at its downstream end to the ring 207. A third member, a substantially Z-shape member, is secured at its upstream end to the second member and is secured at its downstream end to the portion, the U-shape portion, of the ring 207A defining the annular circumferentially and radially extending slot 114. The first and second members and the ring 207 define a first chamber 208A and the second member has apertures 210 to supply coolant into the first chamber 208A and the ring 207 has effusion cooling apertures 212 to supply coolant out of the first chamber 208. The second and third members and the ring 207 define a second chamber 208B and the second member has apertures 210A to supply coolant into the second chamber 208B and the ring 207 has ballistic cooling apertures 212A to supply coolant into the combustion chamber to control the combustion chamber exit temperature traverse profile. The ballistic cooling apertures 212A have a greater cross-sectional area, e.g. diameter, greater than the effusion cooling apertures 212. Each member 205A may be secured to the ring 207A or another member in substantially the same manner as described with reference to FIG. 5.

It is to be noted that the first member also defines a chamber with the ring 207A but coolant is not supplied into this chamber or supplied out of this chamber. However, it is equally possible to provide apertures in the first member to supply coolant into this chamber and to provide effusion cooling apertures through the ring 207 to form a film of coolant over a greater axial length, up to the full axial length, of the surface of the ring 207, e.g. of the radially inner sealing ring 82C.

Figure 7:
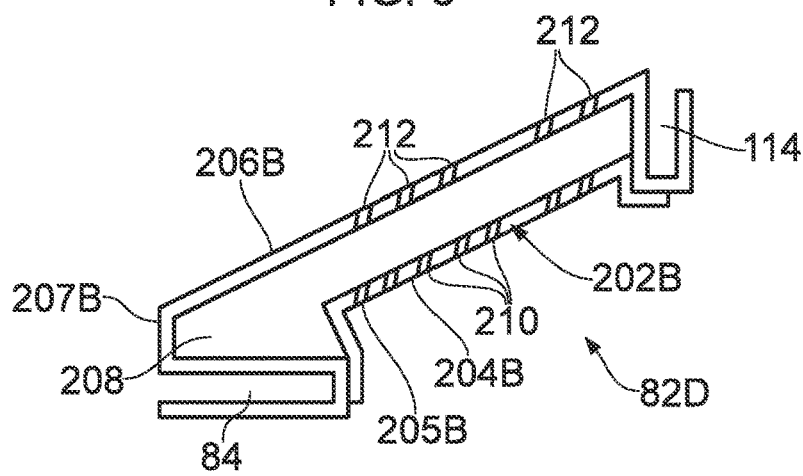
FIG. 7 is further enlarged cross-sectional view of a further radially inner sealing ring of the combustion chamber arrangement shown in FIG. 2.

In an additional arrangement as shown in FIG. 7 the dual wall structure 202C of the radially inner sealing ring, e.g. the radially inner discharge nozzle, 82C extends the full axial length of the radially inner sealing ring, radially inner discharge nozzle 82D. The radially inner wall 204B and the radially outer wall 206B are parallel. The radially outer wall 206B of the dual wall structure 202B comprises a ring 207B and the radially inner wall 204B of the dual wall structure 202B comprises a single member 205B secured to the ring 207B. In this example the dual wall structure 202A comprises a single chamber 208. An upstream end of the member 205B is secured to the portion, the U-shape portion, of the ring 207B defining the annular circumferentially and axially extending slot 84 and a downstream end of the member 205B is secured to the portion, the U-shape portion of the ring 207B defining the annular circumferentially and radially extending slot 114 to define a single chamber. The member 205B may be secured to the ring 207A in substantially the same manner as described with reference to FIG. 5.

In the arrangements of FIGS. 5, 6 and 7 the rings 207, 207A and 207B are made from a material more heat resistant than the members 205, 205A and 205B respectively, for example the rings 207, 207A and 207B may be made from a more heat resistant nickel, cobalt or iron alloy than the members 205, 205A and 205B respectively.

Figure 8:
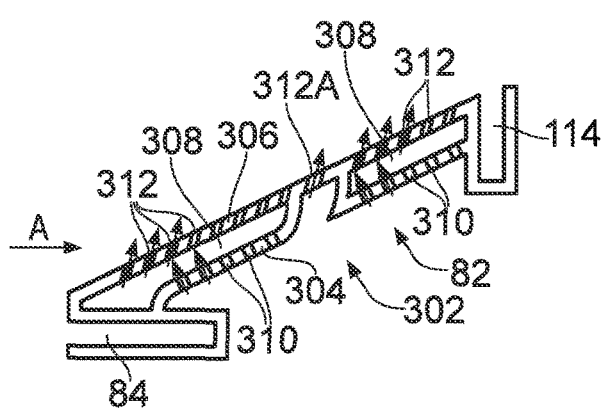
FIG. 8 is further enlarged cross-sectional view of another radially inner sealing ring of the combustion chamber arrangement shown in FIG. 2.
Figure 9:
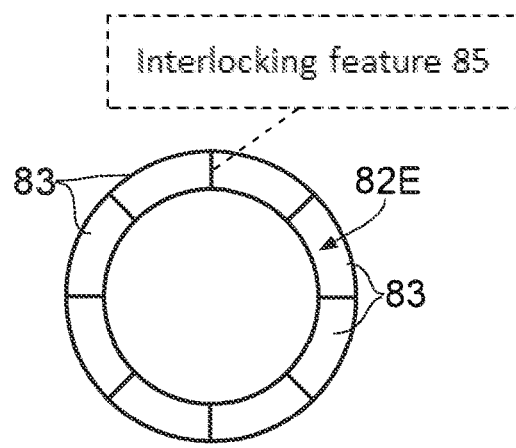
FIG. 9 is a cross-sectional view on a reduced scale in the direction of Arrow A in FIG. 8.

FIGS. 8 and 9 show another arrangement of the radially inner sealing ring, e.g. the radially inner discharge nozzle, 82E. The radially inner sealing ring 82E comprises a plurality of circumferentially arranged segments 83 as shown in FIG. 9. At least a portion of the axial length of each of the segments 83 of the radially inner sealing ring 82E comprises a dual wall structure 302. In this example virtually all of the axial length of each of the segments 83 of the radially inner sealing ring 82E comprises a dual wall structure 302. The radially outer wall 306 and the radially inner wall 304 of the dual wall structure 302 of each segment 83 is an integral structure, e.g. a single piece, a unitary piece or a monolithic piece. The radially inner wall 304 and the radially outer wall 306 of each segment 83 are parallel. Each segment 83 has at least one chamber 308 and in this example each segment 83 has two axially spaced chambers 308. Each segment 83 has circumferentially spaced ends and each of the circumferentially spaced ends of each segment 83 has interlocking features 85 to enable adjacent segments 83 to be secured together. Each segment 83 has an end wall at each of the circumferentially spaced ends to define the at least one chamber 308, in this case the two chambers 308. The radially inner wall 304 has a plurality of apertures 310 to supply coolant into each of the two chambers 308 and the radially outer wall 306 has a plurality of effusion cooling apertures 312 to supply coolant from each of the two chambers 308 onto the radially outer surface of the radially outer wall 306 to form a film of coolant on the radially outer surface of the radially outer wall 306. In addition the radially outer wall 306 has a plurality of ballistic cooling apertures 312A to supply coolant into the combustion chamber to control the combustion chamber exit temperature traverse profile. The ballistic cooling apertures 312A have a greater cross-sectional area, e.g. diameter, than the effusion cooling apertures 312. The ballistic cooling apertures 312A are provided in a single wall region of the radially inner sealing ring 82E between the two axially spaced chambers 308 of dual wall structure 302. The radially outer wall 306 has a frustoconical radially outer surface. The radially inner sealing ring 82E is arranged upstream of the radially inner platforms 89 of the vanes 90 and in particular the whole of the radially inner sealing ring 82E upstream of the annular circumferentially and radially extending slot 114 is arranged upstream of the radially inner platforms 89 of the vanes 90. The radially inner sealing ring 82E is thus exposed to hot combustion gases.

An upstream end of each segment 83 has a part annular circumferentially and axially extending slot 84 arranged to receive an annular axially extending member 92 at the downstream end of the radially inner annular wall structure 40. A downstream end of each segment 83 has a part annular circumferentially and radially extending slot 114 arranged to receive radially extending members 116 at the upstream ends of the radially inner platforms 89 of the vanes 90.

Figure 10:
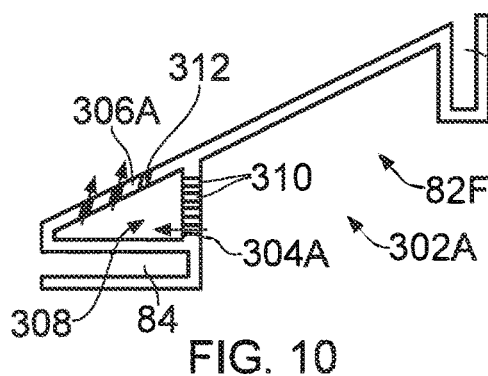
FIG. 10 is further enlarged cross-sectional view of a further radially inner sealing ring of the combustion chamber arrangement shown in FIG. 2.

Another arrangement of the radially inner sealing ring, e.g. the radially inner discharge nozzle, 82F is shown in FIG. 10. The radially inner sealing ring 82F also comprises a plurality of circumferentially arranged segments 83 as shown in FIG. 9. At least a portion of the axial length of each of the segments 83 of the radially inner sealing ring 82F comprises a dual wall structure 302A. The radially outer wall 306A and a radial wall 304A of the dual wall structure 302A of each segment 83 is an integral structure, e.g. a single piece, a unitary piece or a monolithic piece. Each segment 83 has a single chamber 308 and the chamber 308 is arranged at the upstream end of the segment 83. The dual wall structure 302A extends up to a third of the axial length of the radially inner sealing ring 82F. Each segment 83 has a single wall structure, which is a continuation of the radially outer wall 306A, downstream of the upstream end of the segment 83. The radial wall 304A of each segment 83 extends and is secured to the portion, the U-shape portion, defining the part annular circumferentially and axially extending slot 84. The radial wall 304A has a plurality of apertures 310 to supply coolant into the chambers 308 and the radially outer wall 306A has a plurality of effusion cooling apertures 312 to supply coolant from the chambers 308 onto the radially outer surface of the radially outer wall 306A to form a film of coolant on the radially outer surface of the radially outer wall 306A. The radially outer wall 306A has a frustoconical radially outer surface. The radially inner sealing ring 82F is arranged upstream of the radially inner platforms 89 of the vanes 90 and in particular the whole of the radially inner sealing ring 82F upstream of the annular circumferentially and radially extending slot 114 is arranged upstream of the radially inner platforms 89 of the vanes 90. The radially inner sealing ring 82F is thus exposed to hot combustion gases.

Figure 11:
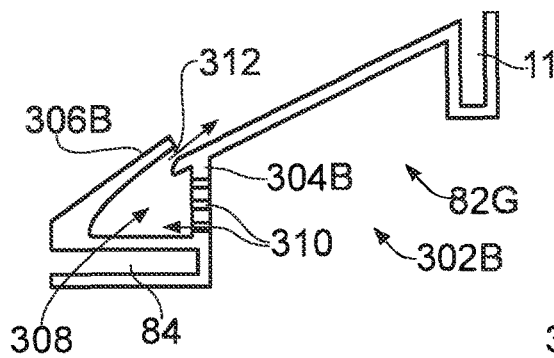
FIG. 11 is further enlarged cross-sectional view of another radially inner sealing ring of the combustion chamber arrangement shown in FIG. 2.

A further arrangement of the radially inner sealing ring, e.g. the radially inner discharge nozzle, 82G is shown in FIG. 11. The radially inner sealing ring 82G also comprises a plurality of circumferentially arranged segments 83 as shown in FIG. 9. At least a portion of the axial length of each of the segments 83 of the radially inner sealing ring 82G comprises a dual wall structure 302B. The radially outer wall 306B and a radial wall 304B of the dual wall structure 302B of each segment 83 is an integral structure, e.g. a single piece, a unitary piece or a monolithic piece. Each segment 83 has a single chamber 308 and the chamber 308 is arranged at the upstream end of the segment 83. The dual wall structure 302B extends up to a third of the axial length of the radially inner sealing ring 82F. Each segment 83 has a single wall structure, which is a continuation of the radially outer wall 306B, downstream of the upstream end of the segment 83. The radial wall 304B of each segment 83 extends and is secured to the portion, the U-shape portion, defining the part annular circumferentially and axially extending slot 84. The radially outer wall 306B of the dual wall structure 302B has a first frustoconical radially outer surface, the single wall structure has a second frustoconical radially outer surface parallel to and downstream of the first frustoconical radially outer surface, a radial surface from the upstream end of the second frustoconical radially outer surface to the downstream end of the first frustoconical radially outer surface and the downstream end of the first frustoconical radially outer surface is spaced radially inwardly of the upstream end of the second frustoconical radially outer surface. At least one aperture, preferably a plurality of effusion cooling apertures, 312 are arranged in the radial surface to direct coolant over the second frustoconical radially outer surface. The radial wall 304B has a plurality of apertures 310 to supply coolant into the chamber 308 and the plurality of effusion cooling apertures 312 are arranged to supply coolant from the chamber 308 onto the radially outer surface of the radially outer wall 306B to form a film of coolant on the radially outer surface of the radially outer wall 306B of the single wall structure. The radially inner sealing ring 82G is arranged upstream of the radially inner platforms 89 of the vanes 90 and in particular the whole of the radially inner sealing ring 82G upstream of the annular circumferentially and radially extending slot 114 is arranged upstream of the radially inner platforms 89 of the vanes 90. The radially inner sealing ring 82G is thus exposed to hot combustion gases.

Figure 12:
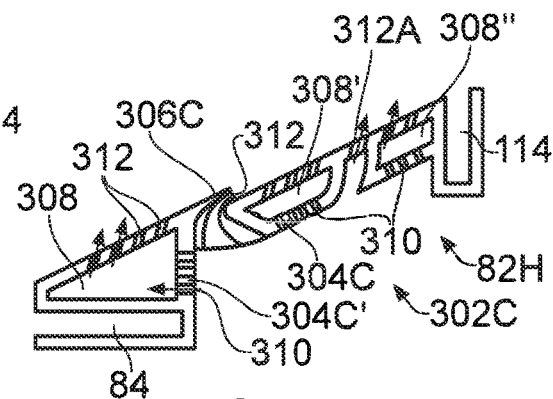
FIG. 12 is further enlarged cross-sectional view of a further radially inner sealing ring of the combustion chamber arrangement shown in FIG. 2.

Another arrangement of the radially inner sealing ring, e.g. the radially inner discharge nozzle, 82H is shown in FIG. 12. The radially inner sealing ring 82H also comprises a plurality of circumferentially arranged segments 83 as shown in FIG. 9. At least a portion of the axial length of each of the segments 83 of the radially inner sealing ring 82H comprises a dual wall structure 302C. In this example virtually all of the axial length of each of the segments 83 of the radially inner sealing ring 82H comprises a dual wall structure 302C. The radially outer wall 306C, the radially inner wall 304C and the radial wall 304C' of the dual wall structure 302C of each segment 83 is an integral structure, e.g. a single piece, a unitary piece or a monolithic piece. The radially inner wall 304C and the radially outer wall 306C of each segment 83 are parallel. Each segment 83 has at least one chamber 308 and in this example each segment 83 has three axially spaced chambers 308. An upstream chamber 308 is defined between the radially outer wall 306C and the radial wall 304C' and a middle chamber 308' and a downstream chamber 308" are defined between the radially outer wall 306C and the radially inner wall 304C. The radially outer wall 306C has a first frustoconical radially outer surface, a second frustoconical radially outer surface parallel to and downstream of the first frustoconical radially outer surface, a radial surface from the upstream end of the second frustoconical radially outer surface to the downstream end of the first frustoconical radially outer surface and the downstream end of the first frustoconical radially outer surface is spaced radially inwardly of the upstream end of the second frustoconical radially outer surface. The radial wall 304C' has a plurality of apertures 310 to supply coolant into the upstream chamber 308 and the radially outer wall 306C has a plurality of effusion cooling apertures 312 to supply coolant from the upstream chamber 308 onto the first frustoconical radially outer surface of the radially outer wall 306C to form a film of coolant on the first frustoconical radially outer surface of the radially outer wall 306C. The radially inner wall 304C has a plurality of apertures 310 to supply coolant into each of the middle and downstream chambers 308' and 308" and the radially outer wall 306C has a plurality of effusion cooling apertures 312 to supply coolant from each of the middle and downstream chambers 308' and 308" onto the second frustoconical radially outer surface of the radially outer wall 306C to form a film of coolant on the second frustoconical radially outer surface of the radially outer wall 306C. At least one aperture, preferably a plurality of apertures, 312 are arranged in the radial surface to direct coolant over the second frustoconical radially outer surface. In addition the radially outer wall 306C has a plurality of ballistic cooling apertures 312A to supply coolant into the combustion chamber to control the combustion chamber exit temperature traverse profile. The ballistic cooling apertures 312A have a greater cross-sectional area, e.g. diameter, than the effusion cooling apertures 312. The ballistic cooling apertures 312A are provided in a single wall region of the radially inner sealing ring 82H between the middle and downstream chambers 308' and 308" of dual wall structure 302C. The radially inner sealing ring 82H is arranged upstream of the radially inner platforms 89 of the vanes 90 and in particular the whole of the radially inner sealing ring 82H upstream of the annular circumferentially and radially extending slot 114 is arranged upstream of the radially inner platforms 89 of the vanes 90. The radially inner sealing ring 82H is thus exposed to hot combustion gases.

Figure 13:
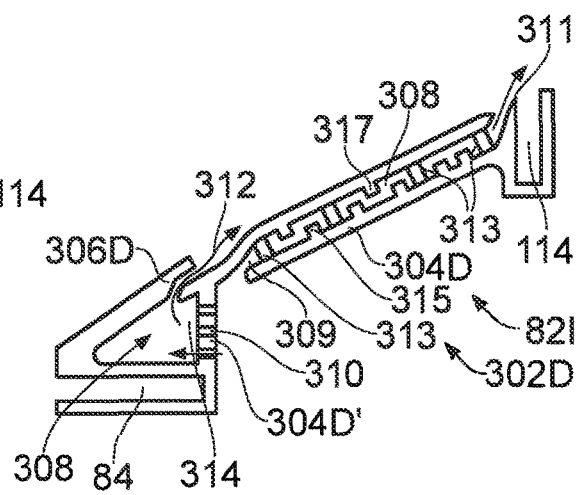
FIG. 13 is further enlarged cross-sectional view of another radially inner sealing ring of the combustion chamber arrangement shown in FIG. 2.

An arrangement of the radially inner sealing ring, e.g. the radially inner discharge nozzle, 82I is shown in FIG. 13. The radially inner sealing ring 82I also comprises a plurality of circumferentially arranged segments 83 as shown in FIG. 9. At least a portion of the axial length of each of the segments 83 of the radially inner sealing ring 82I comprises a dual wall structure 302D. In this example virtually all of the axial length of each of the segments 83 of the radially inner sealing ring 82I comprises a dual wall structure 302D. The radially outer wall 306D, the radially inner wall 304D and the radial wall 304D' of the dual wall structure 302D of each segment 83 is an integral structure, e.g. a single piece, a unitary piece or a monolithic piece. The radially inner wall 304D and the radially outer wall 306D of each segment 83 are parallel. Each segment 83 has at least one chamber 308 and in this example each segment 83 has two axially spaced chambers 308. An upstream chamber 308 is defined between the radially outer wall 306D and the radial wall 304D' and a downstream chamber 308' is defined between the radially outer wall 306D and the radially inner wall 304D. The radially outer wall 306D has a first frustoconical radially outer surface, a second frustoconical radially outer surface parallel to and downstream of the first frustoconical radially outer surface, a radial surface from the upstream end of the second frustoconical radially outer surface to the downstream end of the first frustoconical radially outer surface and the downstream end of the first frustoconical radially outer surface is spaced radially inwardly of the upstream end of the second frustoconical radially outer surface. Each segment 83 has an inlet 309 to the downstream chamber 308 which is defined radially between the radially outer wall 306D and the radially inner wall 304D at the upstream end of the downstream chamber 308. Each segment 83 has an outlet 311 from the downstream chamber 308 which is defined radially between the radially outer wall 306D and the radially inner wall 304D at the downstream end of the downstream chamber 308. The radially inner wall 304D is imperforate and the radially outer wall 306D is imperforate. The downstream chamber 308 of each segment has a plurality of pedestals 313, 315 and 317. The pedestals 313 interconnect the radially inner wall 304D and the radially outer wall 306D. The downstream chamber 308 may have pedestals 315 which extend radially outwardly from the radially inner wall 304D towards the radially outer wall 306D and/or downstream chamber may have pedestals 317 which extend radially inwardly from the radially outer wall 306D towards the radially inner wall 304D. The pedestals 313, 315 and 317 conduct heat from the radially outer wall 306D and the pedestals are cooled by the flow of coolant through the downstream chamber 308 between the radially outer wall 306D and the radially inner wall 304D. At least one aperture, preferably a plurality of effusion cooling apertures, 312 are arranged in the radial surface to direct coolant over the radially outer surface of the portion of the radially outer wall 306D defining the downstream chamber 308. The radial wall 304D' has a plurality of apertures 310 to supply coolant into the upstream chamber 308 and the a least one or a plurality of effusion cooling apertures 312 are arranged to supply coolant from the upstream chamber 308 into a recess 314 and then onto the radially outer surface of the radially outer wall 306B to form a film of coolant on the radially outer surface of the radially outer wall 306B of the single wall structure. The radially inner sealing ring 82I is arranged upstream of the radially inner platforms 89 of the vanes 90 and in particular the whole of the radially inner sealing ring 82I upstream of the annular circumferentially and radially extending slot 114 is arranged upstream of the radially inner platforms 89 of the vanes 90. The radially inner sealing ring 82I is thus exposed to hot combustion gases.

The segments 83 in each of FIGS. 8 to 13 are manufactured by additive layer manufacturing, e.g. by direct laser deposition etc. It may be possible to manufacture the segments 83 by other suitable processes such as by investment casting using ceramic cores to define the chambers and by laser, electro-discharge, electro-chemical drilling the apertures in the radially inner and outer walls. The segments 83 in each of FIGS. 10 to 13 also have circumferentially spaced ends and each of the circumferentially spaced ends of each segment 83 has interlocking features 85 to enable adjacent segments 83 to be secured together. The segments 83 in each of FIGS. 10 to 13 also have an end wall at each of the circumferentially spaced ends to define the at least one chamber 308 and an upstream end of each segment 83 has a part annular circumferentially and axially extending slot 84 arranged to receive an annular axially extending member 92 at the downstream end of the radially inner annular wall structure 40 and a downstream end of each segment 83 has a part annular circumferentially and radially extending slot 114 arranged to receive radially extending members 116 at the upstream ends of the radially inner platforms 89 of the vanes 90.

The whole of the structure of each segment may be an integral structure, e.g. a single piece, a unitary piece or a monolithic piece for each of the arrangements shown in FIGS. 8 to 13.

The apertures 110, 210, 310 provide impingement cooling of the radially outer wall of the associated dual wall structure. The axes of apertures 110, 210, 310 are generally arranged perpendicularly to the surface of the radially outer wall of the associated dual wall structure. The effusion cooling apertures 112, 212, 312 are arranged at an angle of more than or equal to 15° to less than or equal to 45° to the radially outer surface of the radially outer wall of the associated dual wall structure to direct the coolant in a downstream direction towards the vanes 90. The effusion cooling apertures 112, 212, 312 are arranged at an angle of less than or equal to −60° to less than or equal to 60° to a plane containing the axis of the annular combustion chamber, e.g. the effusion cooling apertures 112, 212, 312 may be arranged to direct the coolant circumferentially. The apertures 110, 210, 310 and the effusion cooling apertures 112, 212, 312 have a diameter of more than or equal to 0.5 mm and less than or equal to 1.5 mm. The ballistic cooling apertures 112A, 212A, 312A are arranged at an angle of more than or equal to 15° to less than or equal to 60° to the radially outer surface of the radially outer wall of the associated dual wall structure to direct the coolant in a downstream direction towards the vanes 90. The ballistic cooling apertures 112A, 212A, 312A are arranged at an angle of less than or equal to −60° to less than or equal to 60° to a plane containing the axis of the annular combustion chamber, e.g. the ballistic cooling apertures 112A, 212A, 312A may be arranged to direct the coolant circumferentially. The ballistic cooling apertures 112A, 212A, 312A have a diameter of more than or equal to 0.5 mm and less than or equal to 1.5 mm. In arrangements, e.g. FIGS. 3 and 5 etc., in which the effusion cooling apertures 112 and 212 are also acting as ballistic cooling apertures, the diameter of the apertures 110 and 210 is at least three times the diameter of the effusion cooling apertures 112 and 212 respectively and the diameters of the apertures may be more than or equal to 3 mm and less than or equal to 10 mm.

An advantage of the present disclosure is that it provides better cooling of the radially inner sealing ring. This may result in reduced cracking and thermal distortion of the radially inner sealing ring leading to an increase in the working life of the radially inner sealing ring. In addition the reduced thermal distortion of the radially inner sealing ring may result in the radially inwardly extending members, or rails, of the vanes not being exposed to hot combustion gases and hence thermal oxidation hence increasing the working life of the vanes.

The combustion chamber may be a gas turbine engine combustion chamber.

The gas turbine engine may be an industrial gas turbine engine, an automotive gas turbine engine, a marine gas turbine engine or an aero gas turbine engine.

The aero gas turbine engine may be a turbofan gas turbine engine, a turbojet gas turbine engine, a turbo-propeller gas turbine engine or a turbo-shaft gas turbine engine. The turbofan gas turbine engine may have a gearbox between a turbine and the fan or a compressor or the turbo-propeller gas turbine engine may have a gearbox between a turbine and the fan or a compressor.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A combustion chamber arrangement comprising an annular combustion chamber, a plurality of circumferentially arranged vanes, a radially inner sealing ring and a radially outer sealing ring, the annular combustion chamber comprising a radially inner annular wall structure, a radially outer annular wall structure spaced radially outwardly from the radially inner annular wall structure and an axially upstream annular wall structure, an upstream end of the radially inner annular wall structure being secured to a radially inner end of the axially upstream annular wall structure and an upstream end of the radially outer annular wall structure being secured to a radially outer end of the axially upstream annular wall structure, the vanes being arranged at the axially downstream end of the annular combustion chamber, each of the vanes comprising a radially inner platform, a radially outer platform and an aerofoil extending radially between the radially inner platform and the radially outer platform, the radially inner sealing ring being arranged to form a seal between a downstream end of the radially inner annular wall structure and the radially inner platforms of the vanes and the radially outer sealing ring being arranged to form a seal between a downstream end of the radially outer annular wall structure and the radially outer platforms of the vanes, at least a portion of the axial length of the radially inner sealing ring comprising a dual wall structure, the dual wall structure including a radially inner wall and a radially outer wall spaced radially from the radially inner wall to define at least one chamber, the radially inner wall having a plurality of apertures to supply coolant into the at least one chamber and the radially outer wall having a radially outer surface and a plurality of effusion cooling apertures to supply coolant from the at least one chamber onto the radially outer surface of the radially outer wall,
wherein an upstream end of the radially inner sealing ring having an annular circumferentially and axially extending slot arranged to receive an annular axially extending member at the downstream end of the radially outer annular wall structure, and a downstream end of the radially inner sealing ring having an annular circumferentially and radially extending slot arranged to receive radially extending members at the upstream ends of the radially inner platforms of the vanes.

2. A combustion chamber arrangement as claimed in claim 1 wherein the radially inner wall and the radially outer wall are parallel.

3. A combustion chamber arrangement as claimed in claim 1, wherein the downstream end of the radially inner sealing ring being at a greater radius than the upstream end of the radially inner sealing ring.

4. A combustion chamber arrangement as claimed in claim 1, wherein the dual wall structure extends the full axial length of the radially inner sealing ring.

5. A combustion chamber arrangement as claimed in claim 1, wherein the radially inner wall of the dual wall structure comprising a ring and the radially outer wall comprising a plurality of circumferentially arranged tiles secured on the ring.

6. A combustion chamber arrangement as claimed in claim 5, wherein the tiles extend the full length of the radially inner wall of the dual wall structure.

7. A combustion chamber arrangement as claimed in claim 5, wherein each tile is secured to the ring by at least one fastener arrangement.

8. A combustion chamber arrangement comprising an annular combustion chamber, a plurality of circumferentially arranged vanes, a radially inner sealing ring and a radially outer sealing ring,
the annular combustion chamber comprising a radially inner annular wall structure, a radially outer annular wall structure spaced radially outwardly from the radially inner annular wall structure and an axially upstream annular wall structure, an upstream end of the radially inner annular wall structure being secured to a radially inner end of the axially upstream annular wall structure and an upstream end of the radially outer annular wall structure being secured to a radially outer end of the axially upstream annular wall structure,
the vanes being arranged at the axially downstream end of the annular combustion chamber, each of the vanes comprising a radially inner platform, a radially outer platform and an aerofoil extending radially between the radially inner platform and the radially outer platform,
the radially inner sealing ring being arranged to form a seal between a downstream end of the radially inner annular wall structure and the radially inner platforms of the vanes and the radially outer sealing ring being arranged to form a seal between a downstream end of the radially outer annular wall structure and the radially outer platforms of the vanes,
at least a portion of the axial length of the radially inner sealing ring comprising a dual wall structure, the dual wall structure including a radially inner wall and a radially outer wall spaced radially from the radially inner wall to define at least one chamber, the radially inner wall having a plurality of apertures to supply coolant into the at least one chamber and the radially outer wall having a radially outer surface and a plurality of effusion cooling apertures to supply coolant from the at least one chamber onto the radially outer surface of the radially outer wall,
wherein the radially outer wall of the dual wall structure comprises a ring and the radially inner wall comprises at least one member secured on the ring.

9. A combustion chamber arrangement as claimed in claim 8, wherein an upstream end of the radially outer wall of the dual wall structure has an annular circumferentially and axially extending slot arranged to receive an annular axially extending member at the downstream end of the radially outer annular wall structure, and a downstream end of the radially outer wall of the dual wall structure has an annular circumferentially and radially extending slot arranged to receive radially extending members at the upstream ends of the radially inner platforms of the vanes.

10. A combustion chamber arrangement as claimed in claim 9, wherein an upstream end of the at least one member is secured to a structure defining the annular circumferentially and axially extending slot and a downstream end of the at least one member is secured to a structure defining the annular circumferentially and radially extending slot to define a single chamber.

11. A combustion chamber arrangement as claimed in claim 8, wherein a plurality of members are secured to the ring to define a plurality of chambers and at least one of the members has apertures to supply coolant into one of the chambers.

12. A combustion chamber arrangement as claimed in claim 1, wherein the radially outer wall and the radially inner wall of the dual wall structure are an integral structure, a single piece, a unitary piece or a monolithic piece.

13. A combustion chamber arrangement comprising an annular combustion chamber, a plurality of circumferentially arranged vanes, a radially inner sealing ring and a radially outer sealing ring,
the annular combustion chamber comprising a radially inner annular wall structure, a radially outer annular wall structure spaced radially outwardly from the radially inner annular wall structure and an axially upstream annular wall structure, an upstream end of the radially inner annular wall structure being secured to a radially inner end of the axially upstream annular wall structure and an upstream end of the radially outer annular wall structure being secured to a radially outer end of the axially upstream annular wall structure,
the vanes being arranged at the axially downstream end of the annular combustion chamber, each of the vanes comprising a radially inner platform, a radially outer platform and an aerofoil extending radially between the radially inner platform and the radially outer platform,
the radially inner sealing ring being arranged to form a seal between a downstream end of the radially inner annular wall structure and the radially inner platforms of the vanes and the radially outer sealing ring being arranged to form a seal between a downstream end of the radially outer annular wall structure and the radially outer platforms of the vanes,
at least a portion of the axial length of the radially inner sealing ring comprising a dual wall structure, the dual wall structure including a radially inner wall and a radially outer wall spaced radially from the radially inner wall to define at least one chamber, the radially inner wall having a plurality of apertures to supply coolant into the at least one chamber and the radially outer wall having a radially outer surface and a plurality of effusion cooling apertures to supply coolant from the at least one chamber onto the radially outer surface of the radially outer wall, wherein the radially inner sealing ring comprises a plurality of circumferentially arranged segments, at least a portion of the axial length of each of the segments comprising a dual wall structure, the radially outer wall and the radially inner wall of the dual wall structure of each segment is an integral structure, a single piece, a unitary piece or a monolithic piece.

14. A combustion chamber arrangement as claimed in claim 13, wherein each segment has at least one chamber.

15. A combustion chamber arrangement as claimed in claim 13, wherein each segment has circumferential ends and the circumferential end of each segment has interlocking features to enable adjacent segments to be secured together.

16. A combustion chamber arrangement as claimed in claim 13, wherein an upstream end of each segment has a part annular circumferentially and axially extending slot arranged to receive an annular axially extending member at the downstream end of the radially outer annular wall structure, and a downstream end of the each segment has a part annular circumferentially and radially extending slot arranged to receive radially extending members at the upstream ends of the radially inner platforms of the vanes.

17. A combustion chamber arrangement as claimed in claim 13, wherein each segment has a single chamber arranged at the upstream end of the segment, and each segment has a single wall structure downstream of the upstream end of the segment.

18. A combustion chamber arrangement as claimed in claim 13, wherein each segment has two axially spaced chambers, there is a single wall structure between the two axially spaced chambers, and there are ballistic cooling apertures in the single wall structure.

19. A combustion chamber arrangement as claimed in claim 13, wherein each segment has two axially spaced chambers, there is a single wall structure between the two axially spaced chambers, the single wall structure is set back from a frustoconical radially outer surface to form an annular recess.

20. A combustion chamber arrangement as claimed in claim 19, wherein each segment has a radial wall to define an upstream chamber upstream of the single wall structure and a radially inner wall parallel to the radially outer wall to define a downstream chamber, each segment has at least one aperture to supply coolant into the annular recess and over the frustoconical radially outer surface, the upstream end of the downstream chamber of each segment defines an inlet to the downstream chamber and the radially inner wall is imperforate.

21. A combustion chamber arrangement as claimed in claim 20, wherein the downstream chamber of each segment has a plurality of pedestals.

22. A combustion chamber arrangement as claimed in claim 13, wherein the radially outer wall has a first frustoconical radially outer surface, a second frustoconical radially outer surface parallel to and downstream of the first frustoconical radially outer surface, a radial surface from the upstream end of the second frustoconical radially outer surface to the downstream end of the first frustoconical radially outer surface and the downstream end of the first frustoconical radially outer surface is spaced radially inwardly of the upstream end of the second frustoconical radially outer surface, at least one aperture is arranged in the radial surface to direct coolant over the second frustoconical radially outer surface.

23. A combustion chamber arrangement as claimed in claim 22, wherein each segment has a single chamber arranged at the upstream end of the segment, each segment has a single wall structure downstream of the upstream end of the segment, the single chamber is arranged to supply coolant through the at least one aperture in the radial surface over the second frustoconical radially outer surface.

24. A combustion chamber arrangement as claimed in claim 22, wherein each segment has three axially spaced chambers, there is a single wall structure between a middle chamber and a downstream chamber of the three axially spaced chambers, there are ballistic cooling apertures in the single wall structure, the at least one aperture in the radial surface is arranged to direct coolant over a portion of the radially outer wall defining the middle chamber and downstream chamber.

* * * * *